United States Patent [19]

Sasazawa et al.

[11] 4,267,207

[45] May 12, 1981

[54] PROCESS FOR PRODUCING COBALT-CONTAINING FERROMAGNETIC IRON OXIDE POWDER

[75] Inventors: Koji Sasazawa; Tatsuji Kitamoto; Goro Akashi; Kouichi Masaki; Shinichiro Dezawa, all of Odawara, Japan

[73] Assignee: Fuji Photo Film Co., Ltd., Minami-ashigara, Japan

[21] Appl. No.: 39,028

[22] Filed: May 14, 1979

Related U.S. Application Data

[63] Continuation of Ser. No. 886,863, Mar. 15, 1978, abandoned.

[30] Foreign Application Priority Data

Mar. 16, 1977 [JP] Japan .................................. 52-29102

[51] Int. Cl.$^3$ .............................................. B05D 5/12
[52] U.S. Cl. ..................................... 427/129; 427/127; 427/128; 427/130; 427/131; 427/132
[58] Field of Search ....................... 427/127, 128–132; 252/62.62, 62.56; 428/900

[56] References Cited

U.S. PATENT DOCUMENTS

| | | | |
|---|---|---|---|
| 4,066,564 | 1/1978 | Sasazawa et al. | 427/127 |
| 4,066,565 | 1/1978 | Sasazawa et al. | 427/127 |
| 4,069,164 | 1/1978 | Dezawa et al. | 427/127 |
| 4,125,474 | 11/1978 | Dezawa et al. | 427/127 |

Primary Examiner—Bernard D. Pianalto
Attorney, Agent, or Firm—Sughrue, Rothwell, Mion, Zinn and Macpeak

[57] ABSTRACT

A process for producing a cobalt-containing ferromagnetic iron oxide powder suitable for magnetic recording which comprises
  (a) mixing cobalt ion, ferrous ion and an alkali with an aqueous dispersion of acicular ferromagnetic iron oxide nuclei under non-oxidizing conditions at a temperature of about 50° C. or less;
  (b) heating the dispersion to a temperature of at least about 60° C. but below the boiling point of the dispersion under non-oxidizing conditions to cause a reaction; and
  (c) treating the dispersion at a temperature of at least about 60° C. but below the boiling point of the dispersion under the following conditions:
    (1) initially treating the dispersion under non-oxidizing conditions for about 5 minutes or more;
    (2) subsequentially treating the dispersion under oxidizing conditions for about 5 minutes or more prior to the termination of the reaction; and
    (3) a total treating time under non-oxidizing conditions and oxidizing conditions of at least about 30 minutes.

20 Claims, No Drawings

PROCESS FOR PRODUCING COBALT-CONTAINING FERROMAGNETIC IRON OXIDE POWDER

This is a continuation of application Ser. No. 886,863, filed Mar. 15, 1978 and now abandoned.

BACKGROUND OF THE INVENTION

1. Field of the Invention

This invention relates to a process for producing a ferromagnetic iron oxide powder useful for magnetic recording, and more specifically, to a process for producing a ferromagnetic iron oxide powder having a high coercive force, a superior stability to pressure and heat and a high degree of dispersibility in organic solvents.

2. Description of the Prior Art

The ferromagnetic iron oxide for high density magnetic recording should desirably have a high coercive force.

Known techniques for increasing the coercive force of a ferromagnetic iron oxide powder include, for example, a method which comprises causing the ferromagnetic iron oxide particles found to be acicular and increasing the shape anisotropy of the ferromagnetic iron oxide particles, a method which involves adding cobalt to the ferromagnetic iron oxide, and a method for producing acicular ferromagnetic iron oxide containing cobalt which has the advantages of the first two methods.

One typical method for adding cobalt to acicular ferromagnetic iron oxide comprises incorporating cobalt ion in $\alpha$-FeOOH, $\gamma$-FeOOH, $\beta$-FeOOH, etc. which are starting materials for the production of ferromagnetic iron oxide, and calcining the mixture to form a ferromagnetic powder.

Another method for obtaining cobalt-containing a acicular ferromagnetic iron oxide comprises adhering a cobalt compound to the surface of cobalt-free ferromagnetic iron oxide, and then calcining the product.

Magnetic recording media such as magnetic tapes prepared using cobalt-containing ferromagnetic iron oxide obtained by the methods described above have the defect that they are unstable to pressure and heat, and on repeated reproduction, the magnetic signals recorded become weak, or print through is great.

Another method for increasing the coercive force of ferromagnetic iron oxide using cobalt comprises adhering a cobalt-containing layer intimately to the surface of acicular ferromagnetic iron oxide, and increasing the adhered layer (see, for example, Japanese Patent Publication No. 4825/62 and U.S. Pat. No. 3,046,158). This technique has been improved as described in Japanese Patent Publication No. 49475/74, Japanese Patent Application (OPI) No. 113199/74 (The term "OPI" as used herein refers to a "published unexamined Japanese patent application", hereinafter the same) (corresponding to British Pat. No. 1,441,183), and Japanese Patent Publication Nos. 29157/75 and 33319/77.

In the method comprising increasing a cobalt ferrite layer as described above, the coercive force of the ferromagnetic iron oxide is nearly proportional to the volume of the cobalt ferrite layer on the surface of the iron oxide. The cobalt ferrite layer comprises cobalt doped ferromagnetic iron oxide which is unstable to pressure and heat. Therefore, if an attempt is made to obtain a ferromagnetic iron oxide powder having a high coercive force using this method, the defects of the cobalt ferrite layer grown on the surface of the ferromagnetic iron oxide powder appear gradually. Hence, it is difficult to improve the stability of the ferromagnetic iron oxide and to obtain a ferromagnetic iron oxide powder having a high coercive force.

In the method which comprises adhering a cobalt compound to the surface of cobalt-free ferromagnetic iron oxide, the coercive force attainable is at most about 500 to 600 Oe, and it is difficult to obtain higher coercive forces which are required for modern magnetic recording media.

A method to increase the coercive force further by adding ferrous ion ($Fe^{+2}$) together with the cobalt compound (see, for example, Japanese Patent Publication Nos. 24237/77 and 36751/77) is also known. However, products obtained using this method have poor dispersibility in organic solvents, and therefore, magnetic recording media prepared using the ferromagnetic powder obtained by this method have the defect that a large amount of noise is developed. For use in high density recording, therefore, an improvement has been desired on this situation.

SUMMARY OF THE INVENTION

An object of this invention is to provide an improved process for adhering a cobalt-containing layer intimately to the surface of a ferromagnetic iron oxide to obtain a ferromagnetic iron oxide powder having a high coercive force and good dispersibility in organic solvents.

According to this invention, there is provided a process for producing a cobalt-containing ferromagnetic iron oxide powder suitable for magnetic recording which comprises (a) mixing cobalt ion, ferrous ion and an alkali with an aqueous dispersion of acicular ferromagnetic iron oxide nuclei under non-oxidizing conditions at a temperature of about 50° C. or less;

(b) heating the dispersion to a temperature of at least about 60° C. but below the boiling point of the dispersion under non-oxidizing conditions to cause a reaction; and (c) treating the dispersion at a temperature of at least about 60° C. but below the boiling point of the dispersion under the following conditions:
  (1) initially treating the dispersion under non-oxidizing conditions for about 5 minutes or more;
  (2) subsequentially treating the dispersion under oxidizing conditions for about 5 minutes or more prior to the termination of the reaction; and
  (3) a total treating time under non-oxidizing conditions and oxidizing conditions of at least about 30 minutes.

DETAILED DESCRIPTION OF THE INVENTION

The superior characteristics of the method for adhering and increasing a cobalt compound layer on the surface of a cobalt-free acicular ferromagnetic iron oxide powder were noted, and extensive investigations thereon were made. These investigations led to the discovery that a ferromagnetic iron oxide powder having a higher coercive force than those iron oxide powders available heretofore and improved dispersibility in organic solvents can be obtained by heat-treating a ferromagnetic iron oxide slurry containing ferrous ion, cobalt ion and an alkali in such a manner that the mixing of the ingredients before the start of the heat-treatment and in the early stage of the heat-treatment are performed while strictly inhibiting oxidation, and then the heat-treatment for a specified period of time is carried out under oxidizing conditions to partially oxidize the reaction mixture.

Evaluation of dispersibility of ferromagnetic iron oxide particles in organic solvents is somewhat difficult. The dispersibility can, however, be determined by the viscosity of a liquid mixture of the ferromagnetic iron oxide powder, a resin and a solvent and increase in viscosity with the lapse of time. When the same amounts of the resin and the solvent are kneaded with the same amount of ferromagnetic iron oxide powder, the dispersibility of the ferromagnetic iron oxide powder is better when the viscosity of the resulting liquid mixture is lower or the increase of the viscosity with time is smaller.

The ferromagnetic iron oxide obtained by this invention exhibits superior characteristics from this standpoint. The reason for this is not clear, but, while not desiring to be bound, it is presumed that the oxidation of the surface of the ferromagnetic particles renders the surface hydrophobic and a coating solution prepared from these magnetic particles has low thixotropy; or it reduces changes of the coating solution by absorbed moisture and thus stabilizes the coating solution.

In performing the present invention, it is preferred to add the cobalt ion, the ferrous ion and the alkali to the iron oxide powder, start the heating of the mixture, and begin oxidation after the temperature of the mixture has reached about 60° C. or more. If oxidizing conditions are used before the addition of the cobalt ion and ferrous ion, the coercive force of the ferromagnetic iron oxide does not increase, and moreover, the distribution of coercive force is broadened to result in the production of an unsuitable magnetic powder for magnetic recording. Furthermore, when oxidizing conditions are used before the temperature reaches about 60° C. after starting the reaction, the coercive force of the resulting product is insufficient.

In order to increase the coercive force, the amount of cobalt should be at least about 1 atomic % and e.g., up to about 10 atomic %, based on the entire iron present in the acicular ferromagnetic iron oxide to be used as a nucleus. The amount of the ferrous ion is preferably equivalent to or larger than that of the cobalt. If the amount of the ferrous ion is less than the equivalent amount by weight to the cobalt, the coercive force of the product tends to decrease.

Desirably, as a nucleus, an acicular ferromagnetic iron oxide used in conventional magnetic recording media can be used.

Examples of ferromagnetic iron oxides which can be used in this invention include maghemite ($\gamma$-$Fe_2O_3$), magnetite ($Fe_3O_4$), Berthollide iron oxides (iron oxides having a degree of oxidation intermediate between maghemite and magnetite; e.g., $FeO_x$ where $1.33 < x < 1.50$), metallic iron powder the surface of which is at least oxidized, and iron-containing alloy powders. These ferromagnetic iron oxides have an acicular ratio of about 2:1 to about 20:1, preferably 4:1 to 12:1, and an average particle length of about 0.3 to about 1.5 $\mu$m, preferably 0.4 to 1 $\mu$m. Usually, maghemite and magnetite have a coercive force (Hc) of about 250 to 450 Oe. Berthollide iron oxides obtained by oxidizing or reducing them and having an x value in $FeO_x$ of about 1.35 have a coercive force which is about 30 Oe higher than maghemite and magnetite.

The starting materials which can be used for the cobalt ion and ferrous ion are water-soluble salts, and commercially, the sulfates, chlorides and nitrates are suitable. The hydroxides can also be used in this invention.

Specific examples of suitable cobalt salts which can be used are cobalt chloride, cobalt sulfate, cobalt nitrate and cobalt hydroxide, and specific examples of suitable ferrous salts which can be used are ferrous chloride, ferrous sulfate, ferrous nitrate and ferrous hydroxide. Mixtures of each of these salts can be used if desired.

Examples of alkalies which can be used in this invention are alkali metal hydroxides such as sodium hydroxide and potassium hydroxide and alkali metal carbonates such as sodium carbonate and potassium carbonate. The total amount of the alkali is desirably such that after neutralization of the cobalt ion and the ferrous ion, the [$OH^-$] concentration of the slurry is at least 0.5 N, e.g., 0.5 N up to about 3 N. If the [$OH^-$] concentration is lower than about 0.5 N, only a small effect in increasing the coercive force of the magnetic particles is achieved.

The oxidizing conditions can be provided by adding an oxidizing agent such as nitrate ion and nitrite ion to the reaction mixture. Alternatively the oxidizing conditions can be provided by bubbling an oxygen-containing gas such as oxygen or air into the reaction mixture.

Suitable sources of nitrate ion are nitric acid, or an ammonium salt or alkali metal salt thereof such as ammonium nitrate, sodium nitrate, potassium nitrate or lithium nitrate; or an alkali earth metal salt such as magnesium nitrate, calcium nitrate, strontium nitrate or barium nitrate. Suitable nitrate ion sources are an ammonium salt or an alkali metal salt of nitrous acid such as ammonium nitrite, sodium nitrite or potassium nitrite or an alkali earth metal nitrite such as barium nitrite. These oxidizing agents are disclosed in U.S. Pat. Nos. 4,066,564, 4,066,565 and 4,069,164.

The amount of the oxidizing agent is about 0.005 to about 0.4, preferably 0.005 to 0.1, equivalent per equivalent of ferrous ion.

The process for producing the ferromagnetic iron oxide powder by this invention is described in more detail hereinbelow.

According to this invention, ferromagnetic iron oxide particles are dispersed in water to form a suspension. With continued stirring, the suspension is subjected to the following steps.

(A) A solution containing cobalt ion and ferrous ion is added to the suspension. Alternatively an alkali in an approximately equivalent amount for neutralization is added to a solution containing cobalt ion and ferrous ion, and the resulting hydroxide slurry is added to the suspension.

(B) An alkali metal hydroxide solution is added to the suspension.

(C) The mixture is heated.

(D) Oxidizing conditions are provided at a given point during the heating in step (C).

(E) The resulting product is washed with water, and dried.

Steps (A) and (B) may be performed in either sequence to produce much the same result. It is necessary to prevent oxidation completely in these steps. If these steps are carried out under oxidizing conditions, the desired coercive force cannot be obtained. Moreover, the distribution of coercive force is broadened, and the product will be quite unsuitable for magnetic recording media.

Step (C) is advantageously carried out at a temperature of at least about 60° C. but below the boiling point of the dispersion because the reaction time required can be shortened, and the heating can be performed in a reactor under atmospheric pressure. Temperatures of up to about 150° C. can be used if an autoclave is employed.

Temperatures of about 50° C. or less are advantageous in Steps (A) and (B) because it is easy to prevent oxidation at these temperatures. Temperatures above 0° C. to about 50° C. can be used.

In Step (D), the oxidation must be started after the reaction for increasing the coercive force has begun. Usually, the oxidation is desirably after at least about 5 minutes or more from the time when the temperature has reached at least about 60° C.

In general, a sufficient total reaction time for steps (C) and (D) is about 30 to 60 minutes, but the reaction may be performed for a shorter or longer time than this, if desired.

Then, in order to remove the excess of alkali in the reaction liquid, the liquid is washed with water until the pH of the reaction liquid becomes about 9.5 or less, preferably 8.5 or less. Subsequently, water-removal is performed by filtration, centrifugal separation, etc., and the residue is dried at about 40° to about 200° C. When a temperature of at least about 100° C. is employed, the drying is carried out in a non-oxidizing atmosphere such as nitrogen gas or an inert gas such as helium gas, argon gas, etc., preferably nitrogen gas.

When the resulting cobalt-containing ferromagnetic iron oxide is magnetite or a Berthollide iron oxide, the iron oxide can be formed into cobalt-containing ferromagnetic iron oxide having a controlled degree of oxidation by treating the iron oxide further under oxidizing conditions.

If the amount of ferrous ion is too large, the resulting cobalt-containing ferromagnetic iron oxide has a large shape and the coercive force of the resulting cobalt-containing ferromagnetic iron oxide does not increase very much. Hence, a suitable amount of ferrous ion is at most about 30 atom %, preferably not more than 15 atom %, more preferably 1 to 10 atom %.

From the standpoint of coercive force and stability, production of cobalt-containing Berthollide iron oxides is preferred.

It has been confirmed that the ferromagnetic iron oxides obtained by the method of this invention described hereinabove have higher coercive forces than those obtained using conventional methods, and have improved stability to pressure and heat.

The ferromagnetic iron oxides obtained by the process of this invention can be used in various applications, but are especially suitable for production of magnetic recording media having good characteristics.

A magnetic recording material can be produced in a conventional manner by mixing the ferromagnetic iron oxide obtained by the process of this invention with a binder and a coating solvent, optionally together with other additives such as a dispersing agent, a lubricant, abrasives or an antistatic agent, coating the resulting dispersion on a non-magnetic support or a non-magnetic support having a back layer on the support, and drying the coated layer while orienting the ferromagnetic particles in a magnetic field. If desired, the resulting magnetic recording material can be subjected to a surface smoothing treatment, and slit, cut, punched or otherwise processed depending on the desired use, and used in the form of tapes, sheets, discs, cards, drums, etc. Techniques of producing magnetic recording materials are described in detail in, for example, Japanese Patent Application Nos. 154491/76 and 3071/77.

The following Examples and Comparative Examples are given to illustrate the present invention in more detail. Unless otherwise indicated herein, all parts, percents, ratios and the like are by weight.

EXAMPLE 1

One kilogram of commercially available ferromagnetic iron oxide for magnetic recording ($\gamma$-$Fe_2O_3$) with an average particle length of about 0.6$\mu$, an acicular ratio of about 8 and a coercive force of 350 Oe was dispersed in 10 liters of water at about 18° C.

Then, 0.5 liter of a 1 mole/l solution of cobalt sulfate was mixed with 1.5 liters of a 1 mole/l solution of ferrous sulfate, and 2 liters of a 2 mole/l solution of sodium hydroxide was added under non-oxidizing conditions and the temperature was kept at about 20° to 25° C. Mixture was stirred to form a hydroxide slurry.

The hydroxide slurry was added to the ferromagnetic iron oxide slurry while bubbling $N_2$ gas through the slurry, and the mixture was stirred at a temperature controlled at about 30° C. With continued stirring, 5 liters of a 5.3 mole/l solution of sodium hydroxide was added and at this time, the temperature of the mixture was 28° C. While containing the bubbling of $N_2$ gas through the slurry, the temperature was increased at a rate of about 2° C./min. In about 30 minutes, the temperature reached about 95° C. The mixture was maintained at this temperature for about 15 minutes, and then the bubbling of $N_2$ gas through the slurry was stopped. As an oxidizing agent, 100 ml of a 2.0 g/100 ml aqueous solution of sodium nitrate was added, and the reaction was continued for 1 hour at the same temperature. The product was cooled, washed with water to remove the alkali, and dried in air at 60° C. to obtain a ferromagnetic iron oxide containing Co.

The resulting ferromagnetic iron oxide powder had a coercive force of 673 Oe and contained 6 atomic % of $Fe^{2+}$.

COMPARATIVE EXAMPLE 1

One kilogram of the same type of iron oxide as used in Example 1 was dispersed in 10 liters of water at 18° C.

Then, 0.5 liter of a 1 mole/l solution of cobalt sulfate and 1.5 liters of a 1 mole/l solution of ferrous sulfate were added and mixed with stirring. Five liters of a 5.3 mole/l solution of sodium hydroxide was added to the iron oxide slurry containing the cobalt ion and ferrous ion with stirring while bubbling $N_2$ gas at a temperature controlled at about 30° C. through the slurry. Subsequently, the temperature of the mixture was increased at a rate of about 2° C./min., and in about 30 minutes, a temperature of about 95° C. was reached. The reaction was continued for about 1 hour at this temperature while bubbling $N_2$ gas through the mixture but sodium nitrate was not added as described in Example 1. The product was cooled, washed to remove the alkali, and dried in air at about 60° C.

The resulting ferromagnetic iron oxide powder had a coercive force of 655 Oe and contained about 11 atomic % of $Fe^{2+}$.

COMPARATIVE EXAMPLE 2

One kilogram of the same type of iron oxide as used in Example 1 was dispersed in 10 liters of water at 18° C.

Then, 0.5 liter of a 1 mole/l solution of cobalt sulfate, 1.5 liters of a 1 mole/l solution of ferrous sulfate and a 10 g/200 ml solution of sodium nitrate were added, and the mixture was well stirred. Then, 5 liters of a 5.3 mole/l solution of sodium hydroxide was added at a temperature controlled at about 30° C. Subsequently, the temperature of the mixture was increased at a rate of about 2° C./min., and when the temperature reached about 95° C., the reaction was performed for about 1 hour at this temperature. These procedures were not conducted using $N_2$ gas as described in Example 1.

The resulting magnetic iron oxide had a coercive force of 592 Oe and contained about 1% of $Fe^{2+}$.

EXAMPLE 2

One kilogram of the same type of ferromagnetic iron oxide as used in Example 1 was dispersed in 10 liters of water at about 18° C.

Then, 0.38 liter of a 1 mole/l solution of cobalt sulfate and 1.5 liters of a 1 mole/l solution of ferrous sulfate were added under non-oxidizing conditions, and they were well mixed with stirring at a temperature controlled at about 30° C. Further, 5 liters of a 5.3 mole/l solution of sodium hydroxide was added at 30° C. and while stirring the mixture and bubbling $N_2$ gas through the mixture, the temperature of the mixture was increased at a rate of about 2° C./min. In about 30 minutes, a temperature of about 95° C. was reached. The mixture was maintained at this temperature for about 30 minutes, and then 100 ml of a 1.0 g/100 ml aqueous solution of sodium nitrate was added as an oxidizing agent. The reaction was continued at this temperature for 30 minutes. The product was cooled, washed with water, and dried in air at 60° C. to produce a ferromagnetic iron oxide powder containing Co.

The resulting ferromagnetic powder had a coercive force of 561 Oe.

The above procedures were repeated except that the amount of sodium nitrate was changed to 2.0 g/100 ml and 10 g/200 ml, respectively. Further, the above procedures were repeated without using the sodium nitrate. The results obtained are tabulated below.

| | Amount of Sodium Nitrate Added to the Reaction Liquid (g) | | | |
|---|---|---|---|---|
| | 1.0 g | 2.0 g | 10.0 g | 0 g |
| Coercive force of the magnetic powder (Oe) | 561 | 569 | 552 | 556 |
| $Fe^{2+}$ (atomic %) | ca. 8 | ca. 6 | ca. 2 | ca. 10 |

The ferromagnetic iron oxide powders in accordance with this invention have high coercive forces and superior dispersibility in organic solvents, and are suitable for use in high density magnetic recording media.

While the invention has been described in detail and with reference to specific embodiments thereof, it will be apparent to one skilled in the art that various changes and modifications can be made therein without departing from the spirit and scope thereof.

What is claimed is:

1. A process for producing a cobalt-containing ferromagnetic iron oxide powder suitable for magnetic recording which comprises (a) mixing cobalt ion, ferrous ion and an alkali with an aqueous dispersion of acicular ferromagnetic iron oxide nuclei under non-oxidizing conditions of nitrogen gas or inert gas which completely prevent oxidation at a temperature of about 50° C. or less;

(b) heating the dispersion to a temperature of at least about 60° C. but below the boiling point of the dispersion under non-oxidizing conditions of nitrogen gas or inert gas which completely prevent oxidation to cause a reaction;

(c) treating the dispersion at a temperature of at least about 60° C. but below the boiling point of the dispersion under the following conditions:

(1) initially treating the dispersion under non-oxidizing conditions of nitrogen gas or inert gas which completely prevent oxidation for about 5 minutes or more;

(2) subsequentially treating the dispersion under oxidizing conditions for about 5 minutes or more prior to the termination of the reaction; and (3) a total treating time under non-oxidizing conditions and oxidizing conditions of at least about 30 minutes, said non-oxidizing conditions which completely prevent oxidation being maintained by bubbling nitrogen or an inert gas through said dispersion and said non-oxidizing conditions being maintained continuously from said mixing of said (a) through said initial treating of step (c) (1).

2. The process of claim 1, wherein after the termination of the reaction, the process includes washing the cobalt-containing ferromagnetic iron oxide powder, and then drying the cobalt-containing ferromagnetic iron oxide powder.

3. The process of claim 2, wherein the washing is carried out until the pH of the washing liquid is about 9.5 or less.

4. The process of claim 2, wherein the drying is carried out at a temperature of about 40° to about 200° C.

5. The process of claim 1, wherein the ferromagnetic iron oxide nuclei have an acicular ratio of about 2:1 to about 20:1, and an average particle length of about 0.3 to about 1.5 μm.

6. The process of claim 1 or 5, wherein the ferromagnetic iron oxide is maghemite, magnetite, a Berthollide iron oxide of the formula $FeO_x$ where $1.33 < x < 1.50$, a metallic iron powder at least whose surface is oxidized, or an iron-containing alloy powder.

7. The process of claim 1, wherein the oxidizing conditions are provided by bubbling an oxygen-containing gas into the dispersion.

8. The process of claim 1, wherein the oxidizing conditions are provided by adding an oxidizing agent to the dispersion.

9. The process of claim 9, wherein the amount of the oxidizing agent is about 0.005 to about 0.4 equivalent per equivalent of ferrous ion.

10. The process of claim 8, wherein the oxidizing agent is nitrate ion or nitrite ion.

11. The process of claim 10, wherein the source of the nitrate ion is nitric acid, ammonium nitrate, an alkali metal nitrate or an alkaline earth metal nitrate, and the source of the nitrite ion is ammonium nitrate, an alkali metal nitrite or an alkaline earth metal nitrite.

12. The process of claim 1, wherein the amount of cobalt is at least 1 atomic % based on the entire amount of iron in the ferromagnetic iron oxide.

13. The process of claim 1, wherein the amount of the ferrous ion is at least equivalent to the amount of the cobalt ion.

14. The process of claim 1, wherein the source of the cobalt ion is cobalt sulfate, cobalt chloride, cobalt nitrate or cobalt hydroxide.

15. The process of claim 1, wherein the source of the ferrous ion is ferrous sulfate, ferrous chloride, ferrous nitrate or ferrous hydroxide.

16. The process of claim 1, wherein the amount of the alkali is such that after neutralization of the cobalt ion and the ferrous ion, the $OH^-$ concentration of the reaction mixture is at least about 0.5 N.

17. The process of claim 1, wherein the alkali is an alkali metal hydroxide or an alkali metal carbonate.

18. A process for producing a cobalt-containing ferromagnetic iron oxide powder suitable for magnetic recording which consists essentially of the sequential steps of
  (a) mixing cobalt ion, ferrous ion and alkali with an aqueous dispersion of acicular ferromagnetic iron oxide nuclei under non-oxidizing conditions of nitrogen gas or inert gas which completely prevent oxidation at a temperature of about 50° C. or less;
  (b) heating the dispersion to a temperature of at least about 60° C. but below the boiling point of the dispersion under non-oxidizing conditions of nitrogen gas or inert gas which completely prevent oxidation to cause a reaction; and
  (c) treating the dispersion at a temperature of at least about 60° C. but below the boiling point of the dispersion under the following conditions:
    (1) initially treating the dispersion under non-oxidizing conditions of nitrogen gas or inert gas which completely prevent oxidation for about 5 minutes or more:
    (2) subsequentially treating the dispersion under oxidizing conditions for about 5 minutes or more prior to the termination of the reaction; and
    (3) a total treating time under non-oxidizing conditions and oxidizing conditions of at least about 30 minutes, said non-oxidizing conditions which completely prevent oxidation being maintained by bubbling nitrogen or inert gas through said dispersion and said non-oxidizing conditions being maintained continuously from said mixing of said (a) through said initial treating of step (c) (1).

19. The process of claim 1 wherein the non-oxidizing conditions in Steps (a), (b) and (c) (1) are maintained by bubbling nitrogen gas through the dispersion.

20. The process of claim 18 wherein the non-oxidizing conditions in Steps (a), (b) and (c) (1) are maintained by bubbling nitrogen gas through the dispersion.

* * * * *